(12) United States Patent
Jiang et al.

(10) Patent No.: US 10,241,362 B2
(45) Date of Patent: Mar. 26, 2019

(54) LIQUID CRYSTAL PANEL AND METHOD FOR FABRICATING THE SAME, DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Liangliang Jiang, Beijing (CN); Quan Gan, Beijing (CN); Lei Guo, Beijing (CN); Yongjun Yoon, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 15 days.

(21) Appl. No.: 15/228,468

(22) Filed: Aug. 4, 2016

(65) Prior Publication Data
US 2017/0219874 A1  Aug. 3, 2017

(30) Foreign Application Priority Data
Feb. 3, 2016 (CN) .......................... 2016 1 0078143

(51) Int. Cl.
*G02F 1/1333* (2006.01)
*G02F 1/1335* (2006.01)
(Continued)

(52) U.S. Cl.
CPC ...... *G02F 1/133514* (2013.01); *G02F 1/1368* (2013.01); *G02F 1/133512* (2013.01);
(Continued)

(58) Field of Classification Search
CPC .......... G02F 2201/56; G02F 1/133514; G02F 1/133526; B29D 11/00278; G02B 3/0068
See application file for complete search history.

(56) References Cited

U.S. PATENT DOCUMENTS 5,764,323 A * 6/1998 Fukuda ................ G02B 3/0068
349/5
5,844,644 A * 12/1998 Oh ..................... G02F 1/133526
349/95
(Continued)

FOREIGN PATENT DOCUMENTS

| CN | 103487965 A | 1/2014 |
|---|---|---|
| CN | 104765200 A | 7/2015 |
| CN | 104880882 A | 9/2015 |
| JP | 2009175600 A | 8/2009 |

OTHER PUBLICATIONS

First Office Action dated Apr. 10, 2018 corresponding to Chinese application No. 201610078143.3.

*Primary Examiner* — Michael H Caley
*Assistant Examiner* — Jonathan Y Jung
(74) *Attorney, Agent, or Firm* — Nath, Goldberg & Meyer; Joshua B. Goldberg

(57) ABSTRACT

The present disclosure provides a liquid crystal panel and a method for fabricating the same, and a display device. The liquid crystal panel includes a first substrate, a second substrate and a liquid crystal layer, and has a plurality of pixel regions. In each pixel region, a surface of the first substrate close to the liquid crystal layer has a first cambered surface, and a surface of the second substrate close to the liquid crystal layer has a second cambered surface; the first cambered surface and the second cambered surface bend in a direction away from a light emergent surface of the liquid crystal panel, and axes of the first cambered surface and the (Continued)

second cambered surface coincide with each other; and 0° viewing angle point of the pixel region is located on the axes.

21 Claims, 2 Drawing Sheets

(51) Int. Cl.
*G02F 1/1368* (2006.01)
*G02F 1/1362* (2006.01)

(52) U.S. Cl.
CPC ............ *G02F 2001/133357* (2013.01); *G02F 2001/136222* (2013.01); *G02F 2201/56* (2013.01)

(56) References Cited

U.S. PATENT DOCUMENTS

| | | | | |
|---|---|---|---|---|
| 6,330,112 | B1* | 12/2001 | Kaise | G02B 27/1033 348/E9.027 |
| 6,865,834 | B2* | 3/2005 | Oda | G03B 21/625 359/621 |
| 2004/0027680 | A1* | 2/2004 | Ozawa | G02B 3/0012 359/642 |
| 2005/0174768 | A1* | 8/2005 | Conner | G02B 27/1053 362/235 |
| 2010/0277805 | A1* | 11/2010 | Schilling | B42D 25/29 359/619 |

* cited by examiner

LIQUID CRYSTAL PANEL AND METHOD FOR FABRICATING THE SAME, DISPLAY DEVICE

TECHNICAL FIELD

The present invention relates to the field of display technology, and particularly to a liquid crystal panel and a method for fabricating the same, and a display device.

BACKGROUND

Currently, liquid crystal displays (LCDs), due to their advantages such as low radiation, small volume, low power consumption and the like, have gradually replaced conventional cathode ray tube (CRT) displays, and are widely applied in notebook computers, portable android device (Pad), flat-screen TVs, etc. Liquid crystal (LC) molecules have double refractive indices (ne, no), and have different polarization and refraction effects on light under different arrangement states, thus functioning as light valves. The function of liquid crystals as light valves can be used to adjust light field intensity of a backlight, so as to achieve gray scale display, and further achieve color display in conjunction with color filtering function of a light filter. Depending on driving manner, the liquid crystal displays can mainly be divided into a passive-matrix type and an active-matrix type.

At present, mainstream products in the market are all driven in an active-matrix manner. As shown in FIG. 1, an existing liquid crystal display panel includes a first substrate (color filter substrate) 1 and a second substrate (array substrate) 2 arranged opposite to each other, and a liquid crystal layer 3 formed between the first substrate 1 and the second substrate 2. Flat panel pixel design, in which the first substrate 1 and the second substrate 2 keep parallel in a horizontal direction, is generally adopted in the existing liquid crystal display panel. When a viewer looks at the display screen from a front viewing angle (0° direction in FIG. 1), a cell thickness d of each sub-pixel is substantially the same, i.e., $d=d_0$, an optical path difference of each sub-pixel is also the same, i.e., $\Delta n*d=\Delta n*d_0$ (wherein $\Delta n=ne-no$), and thus ratios of liquid crystal light efficiency to transmittance for red/green/blue (R/G/B) sub-pixels are the same. When viewed from an oblique angle θ (i.e., viewing angle), the liquid crystal molecule has an optical path difference of $\Delta n*d_0/\cos\theta=\Delta n*d_\theta$, that is, an increased optical path difference, so liquid crystal light efficiency and transmittance for red/green/blue (R/G/B) light vary differently, and thus brightness ratio is no longer constant. That is to say in the case of a large viewing angle, transmittance varies among pixels of different colors. In FIG. 2, $CF_0(\lambda)$ is a transmittance spectrum of the liquid crystal panel at the front viewing angle of 0° viewing angle, $CF_{30}(\lambda)$ is a transmittance spectrum of the liquid crystal panel at the oblique viewing angle of 30° viewing angle, and $CF_{60}(\lambda)$ is a transmittance spectrum of the liquid crystal panel at the oblique viewing angle of 60° viewing angle. As shown in FIG. 2, in a long wavelength range of 635 nm~700 nm, transmittance of red light rises as the viewing angle changes from 0° to 60°; in a short wavelength range of 450 nm~490 nm, transmittance of blue light drops as the viewing angle changes from 0° to 60°; transmittance of light of middle wavelength keeps substantially the same. In other words, if the viewing angle increases constantly, transmittance of red light ($\lambda\approx700$ nm) increases, whereas transmittance of blue light ($\lambda\approx440$ nm) decreases, and therefore, color cast (bias towards red color) may occur at an oblique viewing angle, which affects picture quality.

SUMMARY

In view of the above problem in the existing liquid crystal panel, embodiments of the present invention provide a liquid crystal panel and a method for fabricating the same, and a display device, which can effectively alleviate color cast and transmittance difference.

According to an aspect of the present invention, there is provided a liquid crystal panel, which comprises a first substrate and a second substrate arranged oppositely, and a liquid crystal layer provided between the first substrate and the second substrate, and has a plurality of pixel regions, wherein, in each pixel region, a surface of the first substrate close to the liquid crystal layer has a first cambered surface, and a surface of the second substrate close to the liquid crystal layer has a second cambered surface; the second substrate, the liquid crystal layer and the first substrate are provided in a light emergent direction of the liquid crystal panel in this order, the first cambered surface protrudes towards the liquid crystal layer, the second cambered surface is recessed in a direction away from the liquid crystal layer, axes of the first cambered surface and the second cambered surface coincide with each other; and 0° viewing angle point of the pixel region is located on the axes.

Optionally, the first cambered surface and the second cambered surface are coaxial cylindrical cambered surfaces or coaxial circular surfaces.

Optionally, orthographic projections of the first cambered surface and the second cambered surface onto a light emergent surface of the liquid crystal panel coincide with each other completely.

Optionally, widths of the first cambered surface and the second cambered surface each are equal to a width of the pixel region.

Optionally, the first cambered surface and the second cambered surface have a curvature ranging from 2000 mm to 5000 mm.

Optionally, the first substrate is a color filter substrate, and the second substrate is an array substrate.

Further optionally, the color filter substrate comprises a plurality of color filters having different colors and a dielectric layer provided on a surface of the color filters facing the liquid crystal layer; the dielectric layer has the first cambered surface at a position corresponding to each pixel region.

Further optionally, the array substrate comprises a planarization layer close to the liquid crystal layer, and the planarization layer has the second cambered surface at a position corresponding to each pixel region.

Optionally, the first substrate is an opposite substrate, and the second substrate is a COA substrate.

According to another aspect of the present invention, there is provides a method for fabricating a liquid crystal panel, the liquid crystal panel is divided into a plurality of pixel regions, and the method comprises steps of: preparing a first substrate and a second substrate arranged oppositely, and a liquid crystal layer provided between the first substrate and the second substrate, wherein the second substrate, the liquid crystal layer and the first substrate are provided in a light emergent direction of the liquid crystal panel in this order; for each pixel region, a surface of the first substrate close to the liquid crystal layer is formed to have a first cambered surface, and a surface of the second substrate close to the liquid crystal layer is formed to have a second cambered surface, such that the first cambered surface protrudes towards the liquid crystal layer, the second cambered surface is recessed in a direction away from the liquid crystal layer, axes of the first cambered surface and the second cambered surface coincide with each other, and 0° viewing angle point of the pixel region is located on the axes.

Optionally, the first cambered surface of the first substrate and the second cambered surface of the second substrate are formed by using half exposure or grayscale mask.

According to still another aspect of the present invention, there is provided a display device, comprising the above liquid crystal panel.

The present invention has the following beneficial effects:

in the liquid crystal panel according to the present invention, cross section of the first cambered surface in each pixel region of the first substrate has a first arc, cross section of the second cambered surface of the second substrate has a second arc, and the first arc and the second arc are concentric arcs having the 0° viewing angle point of the pixel region as their center, and therefore, even if the user views the pixel at a viewing angle θ different from the vertical viewing angle (0° viewing angle in the figures), the optical path difference is identical, i.e., $d_\theta=d_0$, thereby solving the problem in the existing liquid crystal panel that transmittance difference and color cast among red/green/blue light may occur when the liquid crystal panel is viewed at an oblique viewing angle θ.

DETAILED DESCRIPTION

To enable those skilled in the art to better understand technical solutions of the present invention, the present invention will be further described in detail below in conjunction with the accompanying drawings and specific implementations.

Figure 1:
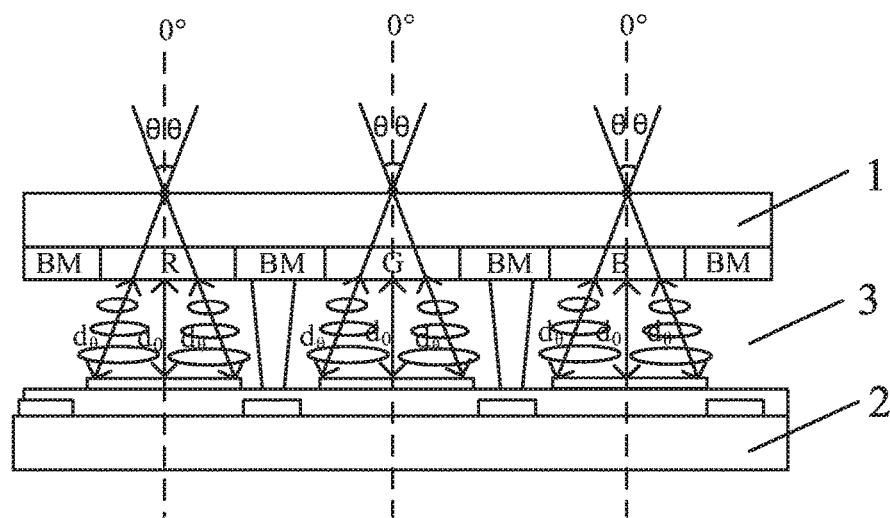
FIG. 1 is a schematic diagram of a structure of an existing liquid crystal panel.
Figure 2:
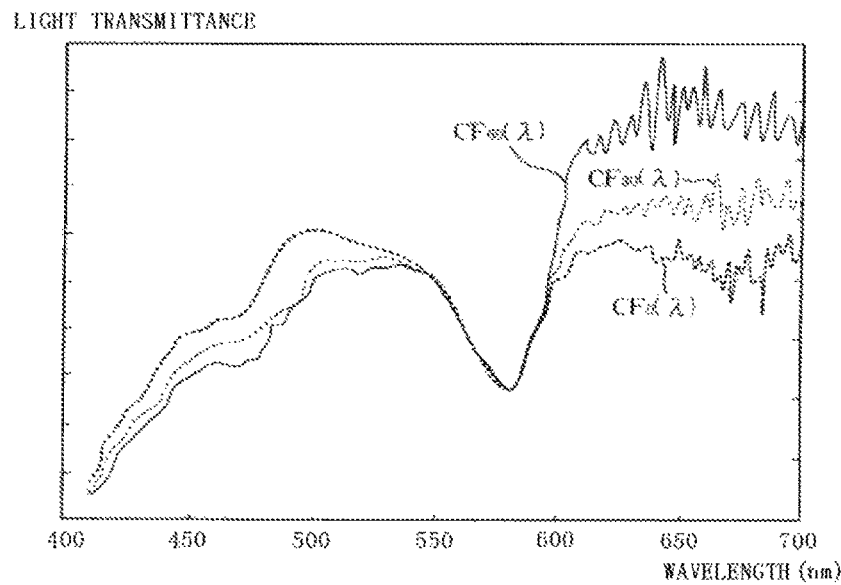
FIG. 2 is a transmittance spectrum of the liquid crystal panel in FIG. 1 at viewing angles of 0°, 30°, and 60°.
Figure 3:
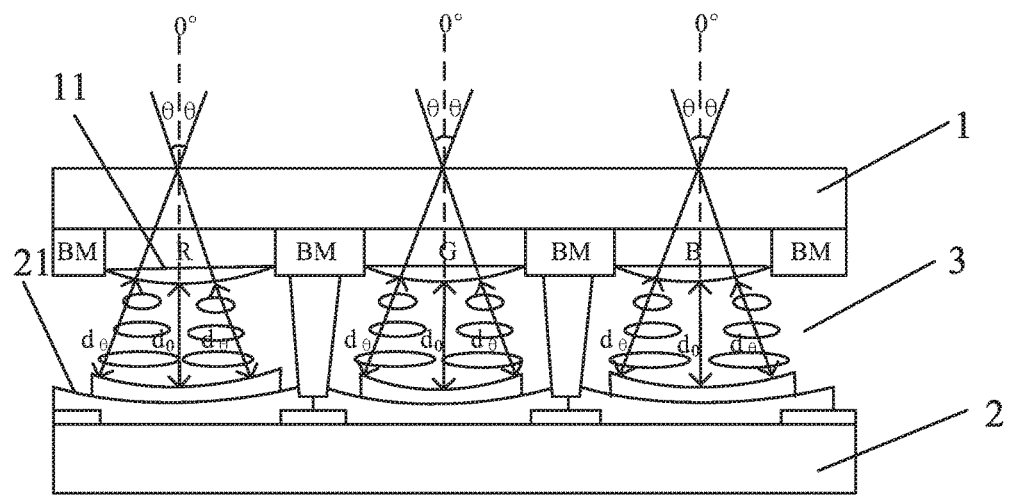
FIG. 3 is a schematic diagram of a liquid crystal panel according to an embodiment of the present invention.

As shown in FIG. 3, an embodiment of the present invention provides a liquid crystal panel having a plurality of pixel regions (each pixel region corresponds to one sub-pixel). The liquid crystal panel includes a first substrate 1 and a second substrate 2 arranged oppositely, and a liquid crystal layer 3 provided between the first substrate 1 and the second substrate 2. In each pixel region, a surface of the first substrate 1 close to the liquid crystal layer 3 has a first cambered surface, and a surface of the second substrate 2 close to the liquid crystal layer 3 has a second cambered surface; the second substrate 2, the liquid crystal layer 3 and the first substrate 1 are provided in a light emergent direction of the liquid crystal panel in this order, the first cambered surface protrudes towards the liquid crystal layer 3, the second cambered surface is recessed in a direction away from the liquid crystal layer 3, and axes of the first cambered surface and the second cambered surface coincide with each other; 0° viewing angle point of each pixel region is located in the axis of the first and second cambered surface corresponding thereto.

It needs to be noted herein that the 0° viewing angle point of each pixel region refers to a central position of the pixel region, i.e., a point of the pixel region viewed by a user at a vertical viewing angle (front viewing angle).

Further, the first cambered surface and the second cambered surface are coaxial cylindrical cambered surfaces or coaxial circular surfaces. In the case where the first cambered surface and the second cambered surface are coaxial cylindrical cambered surfaces, the axes of the first cambered surface and the second cambered surface are an axis of a cylinder, and are parallel to a light emergent surface of the liquid crystal panel and perpendicular to a horizontal moving direction of the user when he/she changes a viewing angle. In the case where the first cambered surface and the second cambered surface are coaxial circular surfaces, the first cambered surface and the second cambered surface are partial spherical surfaces of concentric spheres, respectively, and have axes which pass through centers of the spheres and are parallel to the light emergent surface of the liquid crystal panel and perpendicular to the horizontal moving direction of the user when he/she changes a viewing angle.

Figure 4:
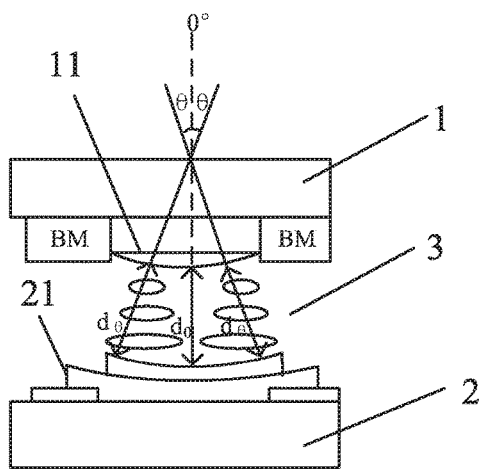
FIG. 4 is a schematic diagram of one pixel region of a liquid crystal panel according to an embodiment of the present invention.

Specifically, as shown in FIG. 4, in which a schematic diagram of one pixel region is shown, it can be seen from the figure that cross section of the first cambered surface has a first arc, cross section of the second cambered surface includes a second arc, and the first arc and the second arc are concentric arcs having the 0° viewing angle point of the pixel region as their center. In other words, when the cross section of one pixel region is taken along a plane passing through the 0° viewing angle point and perpendicular to the light emergent surface of the liquid crystal panel, cross section of a surface of the first substrate 1 facing the second substrate 2 in this pixel region has a first arc, cross section of a surface of the second substrate 2 facing the first substrate 1 has a second arc, and the first arc and the second arc are concentric arcs having the 0° viewing angle point of the pixel region as their center. Therefore, even if the user views the pixel at a viewing angle θ different from the vertical viewing angle (0° viewing angle in the figure), the optical path difference is identical, i.e., $d_\theta=d_0$, thereby solving the problem in the existing liquid crystal panel that transmittance difference and color cast among red/green/blue light may occur when the liquid crystal panel is viewed at an oblique viewing angle θ.

Optionally, orthographic projections of the first cambered surface and the second cambered surface in each pixel region onto the light emergent surface (e.g., a surface of the first substrate 1 away from the liquid crystal layer) of the liquid crystal panel coincide with each other completely, that is, chord lengths of the first cambered surface and the second cambered surface are the same, thus ensuring a same cell thickness at each position in each pixel region, which allows the liquid crystal panel to display uniformly.

Optionally, widths of the first cambered surface and the second cambered surface in each pixel region each are equal to the width of the pixel region. Such arrangement can ensure a same cell thickness at each position in each pixel region to allow uniform display of the liquid crystal panel, and particularly, can also ensure a same optical path difference in the case of different viewing angles in the maximum range of viewing angle.

Optionally, the first cambered surface and the second cambered surface in each pixel region have a curvature ranging from about 2000 mm to about 5000 mm. In this range, a reasonable cell thickness of a liquid crystal cell can be ensured. Needless to say the curvature may be specifically set according to specific conditions.

In the present embodiment, the first substrate 1 is a color filter substrate, and the second substrate 2 is an array substrate; or, the first substrate 1 is an opposite substrate, and the second substrate 2 is a COA (Color Filter On Array) substrate.

In the case where the first substrate 1 is a color filter substrate, and the second substrate 2 is an array substrate, the color filter substrate includes a plurality of color filters having different colors (e.g., color filters of red/green/blue colors), and a dielectric layer 11 provided on a surface of the color filters facing the liquid crystal layer 3. The dielectric layer 11 has, at a position corresponding to each pixel region, the first cambered surface at a side facing the liquid crystal layer 3, and the first cambered surface protrudes towards the liquid crystal layer 3. The array substrate includes a planarization layer 21 close to the liquid crystal layer 3 (needless to say, elements such as a thin film transistor and the like are also provided under the planarization layer), and the planarization layer 21 has, at a position corresponding to each pixel region, the second cambered surface at a side facing the liquid crystal layer 3, and the second cambered surface is recessed in a direction away from the liquid crystal layer 3.

From the above, in each pixel region of the liquid crystal panel in the present embodiment, surfaces of the first substrate 1 and the second substrate 2 close to the liquid crystal layer 3 have the first cambered surface and the second cambered surface, respectively, that is, the display region is provided with curved surfaces, so that in each pixel region, effective cell thickness is the same and the optical path difference is also the same at different viewing angles, and as a result, each of the red/green/blue sub-pixels has light transmittance at different viewing angles keeping consistent with light transmittance at 0° vertical (front) viewing angle. In this way, there is no difference in transmittance among red, green and blue light, which can ensure substantially constant color ratio at different viewing angles, prevent or alleviate color cast, and promote picture quality of a product.

Correspondingly, an embodiment of the present invention further provides a method for fabricating the liquid crystal panel. The method includes steps of: preparing the first substrate 1 and the second substrate 2 arranged oppositely, and the liquid crystal layer 3 provided between the first substrate 1 and the second substrate 2, wherein the second substrate 2, the liquid crystal layer 3 and the first substrate 1 are provided in a light emergent direction of the liquid crystal panel in this order; for each pixel region, a surface of the first substrate 1 close to the liquid crystal layer 3 is formed to have a first cambered surface, and a surface of the second substrate 2 close to the liquid crystal layer 3 is formed to have a second cambered surface, such that the first cambered surface protrudes towards the liquid crystal layer 3, the second cambered surface is recessed in a direction away from the liquid crystal layer 3, the first cambered surface and the second cambered surface are arranged oppositely and have axes coinciding with each other, and 0° viewing angle point of each pixel region is located in the corresponding axis.

In the liquid crystal panel fabricated by the method in the present embodiment, cross section of the first cambered surface of the first substrate 1 in each pixel region has a first arc, cross section of the corresponding second cambered surface of the second substrate 2 has a second arc, and the first arc and the second arc are concentric arcs having the 0° viewing angle point of the pixel region as their center. Therefore, even if the user views the pixel at a viewing angle θ different from the vertical viewing angle (0° viewing angle in the figure), the optical path difference is identical, i.e., $d_\theta = d_0$, thereby solving the problem in the existing liquid crystal panel that transmittance difference and color cast among red/green/blue light may occur when the liquid crystal panel is viewed at an oblique viewing angle θ.

Specifically, in the case where the first substrate 1 is a color filter substrate, and the second substrate 2 is an array substrate, the color filter substrate includes a color filter layer provided on the first substrate and a dielectric layer (OC layer) provided on the color filter layer. At this time, the dielectric layer is formed, by using half exposure or grayscale mask, to have the first cambered surface at a position corresponding to each pixel region. The array substrate includes thin film transistors, a pixel electrode and the like provided on the second substrate, and a planarization layer provided on these elements. At this time, the planarization layer is formed, by using half exposure or grayscale mask, to have the second cambered surface at a position corresponding to each pixel region. Subsequently, the first substrate 1 and the second substrate 2 are assembled together with the liquid crystal layer 3 provided therebetween, thereby finishing fabrication of the liquid crystal panel.

An embodiment of the present invention further provides a display device, which includes the liquid crystal panel according to the embodiment of the present invention.

The display device may be a liquid crystal display device, e.g., any product or component with a display function, such as a liquid crystal panel, electronic paper, a mobile phone, a tablet computer, a television, a monitor, a notebook computer, a digital photo frame, a navigator or the like.

The display device in the embodiment has good picture quality.

It can be understood that, the above implementations are merely exemplary implementations used for explaining the principle of the present invention, but the present invention is not limited thereto. For those of ordinary skill in the art, various modifications and improvements may be made without departing from the spirit and essence of the present invention, and these modifications and improvements are also deemed as falling within the protection scope of the present invention.

The invention claimed is:

1. A liquid crystal panel, comprising a first substrate and a second substrate arranged oppositely, and a liquid crystal layer provided between the first substrate and the second substrate, and having a plurality of pixel regions, wherein
in each pixel region, a surface of the first substrate close to the liquid crystal layer has a first cambered surface, and a surface of the second substrate close to the liquid crystal layer has a second cambered surface;
the second substrate, the liquid crystal layer and the first substrate are provided in a light emergent direction of the liquid crystal panel in this order, the first cambered surface protrudes towards the liquid crystal layer, the second cambered surface is recessed in a direction away from the liquid crystal layer, and axes of the first cambered surface and the second cambered surface coincide with each other; and
0° viewing angle point of the pixel region is located on the axes,
the first cambered surface and the second cambered surface are each partial spherical surfaces and are configured such that an optical path length of a first light ray from the second cambered surface to the first cambered surface equals to an optical path length of a second light ray from the second cambered surface to the first cambered surface, the first light ray being a light ray that is emitted by the pixel region to which the first cambered surface and the second cambered surface belong, has a first angle with respect to a first straight line perpendicular to a light emergent surface of the liquid crystal panel and passing through a center point of the pixel region to which the first cambered surface and the second cambered surface belong, and reaches a point on the first straight line, and the second light ray being a light ray that is emitted by the pixel region to which the first cambered surface and the second cambered surface belong, has a second angle different from the first angle with respect to the first straight line, and reaches the point on the first straight line.

2. The liquid crystal panel according to claim 1, wherein the first cambered surface and the second cambered surface are coaxial circular surfaces.

3. The liquid crystal panel according to claim 1, wherein orthographic projections of the first cambered surface and the second cambered surface onto a light emergent surface of the liquid crystal panel coincide with each other completely.

4. The liquid crystal panel according to claim 1, wherein widths of the first cambered surface and the second cambered surface each are equal to a width of the pixel region.

5. The liquid crystal panel according to claim 1, wherein the first cambered surface and the second cambered surface have a radius of curvature ranging from 2000 mm to 5000 mm.

6. The liquid crystal panel according to claim 1, wherein the first substrate is a color filter substrate, and the second substrate is an array substrate.

7. The liquid crystal panel according to claim 6, wherein the color filter substrate comprises a plurality of color filters having different colors and a dielectric layer provided on a surface of the color filters facing the liquid crystal layer; the dielectric layer has the first cambered surface at a position corresponding to each pixel region.

8. The liquid crystal panel according to claim 6, wherein the array substrate comprises a planarization layer close to the liquid crystal layer, and the planarization layer has the second cambered surface at a position corresponding to each pixel region.

9. The liquid crystal panel according to claim 1, wherein the first substrate is an opposite substrate, and the second substrate is a COA substrate.

10. A method for fabricating a liquid crystal panel, the liquid crystal panel having a plurality of pixel regions, and the method comprising steps of:

preparing a first substrate and a second substrate arranged oppositely, and a liquid crystal layer provided between the first substrate and the second substrate, wherein the second substrate, the liquid crystal layer and the first substrate are provided in a light emergent direction of the liquid crystal panel in this order;

wherein, for each pixel region, a surface of the first substrate close to the liquid crystal layer is formed to have a first cambered surface, and a surface of the second substrate close to the liquid crystal layer is formed to have a second cambered surface, such that the first cambered surface protrudes towards the liquid crystal layer, the second cambered surface is recessed in a direction away from the liquid crystal layer, axes of the first cambered surface and the second cambered surface coincide with each other, and 0° viewing angle point of the pixel region is located on the axes, the first cambered surface and the second cambered surface are each partial spherical surfaces and are formed such that an optical path length of a first light ray from the second cambered surface to the first cambered surface equals to an optical path length of a second light ray from the second cambered surface to the first cambered surface, the first light ray being a light ray that is emitted by the pixel region to which the first cambered surface and the second cambered surface belong, has a first angle with respect to a first straight line perpendicular to a light emergent surface of the liquid crystal panel and passing through a center point of the pixel region to which the first cambered surface and the second cambered surface belong, and reaches a point on the first straight line, and the second light ray being a light ray that is emitted by the pixel region to which the first cambered surface and the second cambered surface belong, has a second angle different from the first angle with respect to the first straight line, and reaches the point on the first straight line.

11. The method according to claim 10, wherein the first cambered surface of the first substrate and the second cambered surface of the second substrate are formed by using half exposure or grayscale mask.

12. A display device, comprising the liquid crystal panel according to claim 1.

13. The display device according to claim 12, wherein the first cambered surface and the second cambered surface are coaxial circular surfaces.

14. The display device according to claim 12, wherein orthographic projections of the first cambered surface and the second cambered surface onto a light emergent surface of the liquid crystal panel coincide with each other completely.

15. The display device according to claim 12, wherein widths of the first cambered surface and the second cambered surface each are equal to a width of the pixel region.

16. The display device according to claim 12, wherein first cambered surface and the second cambered surface have a radius of curvature ranging from 2000 mm to 5000 mm.

17. The display device according to claim 12, wherein the first substrate is a color filter substrate, and the second substrate is an array substrate.

18. The display device according to claim 17, wherein the color filter substrate comprises a plurality of color filters having different colors and a dielectric layer provided on a surface of the color filters facing the liquid crystal layer; the dielectric layer has the first cambered surface at a position corresponding to each pixel region.

19. The display device according to claim 17, wherein the array substrate comprises a planarization layer close to the liquid crystal layer, and the planarization layer has the second cambered surface at a position corresponding to each pixel region.

20. The display device according to claim 12, wherein the first substrate is an opposite substrate, and the second substrate is a COA substrate.

21. The liquid crystal panel according to claim 1, wherein the first cambered surface has a first arc and the second cambered surface has a second arc, the first arc and the second arc being concentric arcs having one and the same point as a center thereof.

* * * * *